United States Patent
Naruhashi et al.

(10) Patent No.: US 11,311,934 B2
(45) Date of Patent: Apr. 26, 2022

(54) COVERED PARTICLE

(71) Applicant: Nippon Chemical Industrial Co., Ltd., Tokyo (JP)

(72) Inventors: Tomonao Naruhashi, Tokyo (JP); Hiroyuki Inaba, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 18 days.

(21) Appl. No.: 16/973,868

(22) PCT Filed: Jun. 26, 2019

(86) PCT No.: PCT/JP2019/025384
§ 371 (c)(1),
(2) Date: Dec. 10, 2020

(87) PCT Pub. No.: WO2020/012962
PCT Pub. Date: Jan. 16, 2020

(65) Prior Publication Data
US 2021/0174987 A1 Jun. 10, 2021

(30) Foreign Application Priority Data
Jul. 10, 2018 (JP) .............................. JP2018-131124

(51) Int. Cl.
*B22F 1/18* (2022.01)
*C08L 25/14* (2006.01)
(Continued)

(52) U.S. Cl.
CPC ............... *B22F 1/18* (2022.01); *B22F 1/102* (2022.01); *B22F 1/17* (2022.01); *C08F 212/08* (2013.01);
(Continued)

(58) Field of Classification Search
None
See application file for complete search history.

(56) References Cited

U.S. PATENT DOCUMENTS 7,291,393 B2 * 11/2007 Wakiya .................. H05K 3/323
428/407
2004/0109995 A1 * 6/2004 Wakiya .................. B82Y 30/00
428/323
(Continued)

FOREIGN PATENT DOCUMENTS

| CN | 1747073 A | 3/2006 |
|----|-----------|--------|
| CN | 101338416 A | 1/2009 |

(Continued)

OTHER PUBLICATIONS

International Search Report dated Aug. 20, 2019, issued in counterpart International Application No. PCT/JP2019/025384 (1 page).

*Primary Examiner* — Katie L. Hammer
(74) *Attorney, Agent, or Firm* — Westerman, Hattori, Daniels & Adrian, LLP (57) ABSTRACT

The present invention provides covered particles wherein insulating layers cover the surfaces of electroconductive particles, and the covered particles are excellent in the adhesion between the surfaces of the electroconductive particles and the insulating layers. The covered particles includes: electroconductive particles in which metal films are formed on the surfaces of core materials, and a triazole-based compound is disposed on the outer surfaces on the sides opposite to the core materials in the metal films; and insulating layers covering the electroconductive particles, and the insulating layers comprise a compound having phosphonium groups.

6 Claims, 1 Drawing Sheet

(51) Int. Cl.
  *H01B 5/16* (2006.01)
  *C09D 125/08* (2006.01)
  *C08F 212/08* (2006.01)
  *H01R 11/01* (2006.01)
  *H01B 5/00* (2006.01)
  *C08J 3/12* (2006.01)
  *C08K 3/08* (2006.01)
  *C08K 5/3475* (2006.01)
  *B22F 1/17* (2022.01)
  *B22F 1/102* (2022.01)

(52) U.S. Cl.
  CPC ............... *C08J 3/128* (2013.01); *C08K 3/08* (2013.01); *C08K 5/3475* (2013.01); *C08L 25/14* (2013.01); *C09D 125/08* (2013.01); *H01B 5/00* (2013.01); *H01B 5/16* (2013.01); *H01R 11/01* (2013.01); *C08L 2203/20* (2013.01); *C08L 2205/20* (2013.01); *C08L 2207/53* (2013.01)

(56) References Cited

U.S. PATENT DOCUMENTS

| | | |
|---|---|---|
| 2008/0227897 A1 | 9/2008 | Badyrka et al. |
| 2010/0221545 A1* | 9/2010 | Abe .............. C23C 18/1689 428/407 |
| 2013/0256606 A1* | 10/2013 | Matsumoto .......... H01B 1/026 252/514 |
| 2019/0027620 A1 | 1/2019 | Kamiga et al. |
| 2019/0194778 A1* | 6/2019 | Masuda .............. C22C 9/00 |

FOREIGN PATENT DOCUMENTS

| | | |
|---|---|---|
| CN | 103426499 A | 12/2013 |
| JP | 2004-319759 A | 11/2004 |
| JP | 2014-29855 A | 2/2014 |
| JP | 2014-29857 A | 2/2014 |
| JP | 2016-195048 | 11/2016 |
| JP | 2017-137566 A | 8/2017 |
| WO | 2016/063941 A1 | 4/2016 |

* cited by examiner

COVERED PARTICLE

TECHNICAL FIELD

The present invention relates to covered particles in which electroconductive particles are covered with insulating layers.

BACKGROUND ART

Electroconductive particles in which films of a metal such as nickel, gold or the like are formed on the surfaces of resin particles are used as electroconductive materials such as electroconductive adhesives, anisotropic electroconductive films, and anisotropic electroconductive adhesives.

The circuit widths and the pitches of electronic circuits become increasingly smaller with further downsizing of electronic equipment in recent years. Electroconductive particles having a small particle size are desired therewith as electroconductive particles used for the above-mentioned electroconductive adhesives, anisotropic electroconductive films, and anisotropic electroconductive adhesives, and the like. When such electroconductive particles having a small particle size are used, the amount of electroconductive particles blended in an electroconductive material must be increased to enhance the connectivity thereof. However, when the amount of electroconductive particles blended is increased, a short circuit is caused by continuity in unintended directions, namely continuity in directions different from the direction between the counter electrodes, and there is a problem that insulation in the directions is difficultly obtained.

To solve the problem, insulating layer-covered electroconductive particles wherein the surfaces of electroconductive particles are covered with an insulating substance having functional groups with an affinity for metal films, and metal films of electroconductive particles are prevented from being in contact are used. A technique in which metal surfaces are surface-treated with an organic treatment agent beforehand before the metal surfaces are covered with an insulating substance in such electroconductive particles is known.

For example, Patent Literature 1 discloses that the metal surfaces of electroconductive particles are treated with an antirust, and insulating particles having hydroxyl groups are adhered to the electroconductive particles after treatment.

Patent Literature 2 discloses that the metal surfaces of electroconductive particles are treated with a triazole-based compound, and insulating particles having ammonium groups are adhered to the electroconductive particles after treatment.

CITATION LIST

Patent Literature

Patent Literature 1:
  Japanese Patent Laid-Open No. 2014-29857
Patent Literature 2:
  International Publication No. WO 2016/063941

SUMMARY OF INVENTION

However, the electroconductive particles covered with the conventional insulating particles described in Patent Literatures 1 and 2 had room for improvement in the adhesion between the insulating particles and the electroconductive particles. The adhesion between insulating particles and electroconductive particles is important for making continuity between the counter electrodes while obtaining an insulating property in directions different from the direction between the counter electrodes (hereinafter also called merely connection reliability).

Then, an object of the present invention is to provide insulating layer-covered electroconductive particles which are more excellent in the adhesion of an insulating substance to electroconductive particles than conventionally.

The present inventors have earnestly investigated to solve the problem, consequently found that when insulating layers containing phosphonium groups are used as an insulating substance, and a triazole-based compound is imparted to the surfaces of electroconductive particles, insulating layer-covered electroconductive particles are excellent in the affinity between an insulating substance and electroconductive particles having a triazole-based compound, and the coverage of the insulating substance on the electroconductive particles increases further as compared with conventional technology, and completed the present invention.

That is, the present invention provides a covered particle, comprising: an electroconductive particle in which a metal film is formed on a surface of a core material, and a triazole-based compound is disposed on an outer surface of the metal film; and an insulating layer covering the electroconductive particle, wherein the insulating layer comprises a compound having a phosphonium group.

DESCRIPTION OF EMBODIMENTS

The present invention will be described based on preferred embodiments hereinafter.

Covered particles of the present embodiment have electroconductive particles in which metal films are formed on the surfaces of core materials, and a triazole-based compound disposed on the outer surfaces of the metal films and insulating layers covering the electroconductive particles having the triazole-based compound on the surfaces thereof, and the insulating layers contain a compound having phosphonium groups.

Well-known electroconductive particles conventionally used for electroconductive adhesives, anisotropic electroconductive films, and anisotropic electroconductive adhesives can be used.

Core materials in electroconductive particles are particulate. Even though the core materials are inorganic matter or organic matter, the core materials can be used without particular limit. Examples of the core material particles which is inorganic matter include metal particles such as gold, silver, copper, nickel, palladium, and solder; alloys; glass; ceramics; silica; metal or non-metal oxides (including water-containing substances); metal silicates including aluminosilicates; metal carbides; metal nitrides; metal carbonates; metal sulfates; metallic phosphates; metal sulfides; metallates; metal halides; and carbon. Meanwhile, examples of the core material particles which is organic matter include natural fibers; natural resins; polyethylene; polypropylene;

polyvinyl chloride; polystyrene; polybutene; polyamides; polyacrylates; polyacrylonitrile; polyacetal; ionomers; thermoplastic resins such as polyesters; alkyd resins; phenolic resins; a urea resin; a benzoguanamine resin; a melamine resin; a xylene resin; silicone resins; epoxy resins; and diallyl phthalate resins. These may be used alone or in combination of two or more. Among these, core material particles comprising a resin material are preferable in that the specific gravity is low, and the core material particles hardly sediment, are excellent in dispersion stability, and easily maintain electric connection due to the elasticity of the resin as compared with core material particles comprising metal.

When organic matter is used as core material particles, it is preferable that the organic matter do not have a glass transition temperature, or the glass transition temperature be more than 100° C. from the viewpoints that the shapes of the core material particles are easily maintained in an anisotropic electroconductive connection step, and the shapes of the core material particles are easily maintained in a step of forming metal films. When the core material particles have a glass transition temperature, it is preferable that the glass transition temperature be 200° C. or less from the viewpoint that when the electroconductive particles easily soften, and the contact area increases in anisotropic electroconductive connection, continuity is easily made. When the core material particles have a glass transition temperature, it is more preferable that the glass transition temperature be more than 100° C. and 180° C. or less, and it is particularly preferable that the glass transition temperature be more than 100° C. and 160° C. or less from this viewpoint. The glass transition temperature can be measured by a method described in the below-mentioned Examples.

When organic matter is used as the core material particles, and the organic matter is a highly crosslinked resin, the glass transition temperature is hardly observed even in an attempt to measure the glass transition temperature to 200° C. by a method described in the below-mentioned Examples. Herein, such particles are also called particles not having a glass transition point, and such core material particles may be used in the present invention. A specific example of the material of such core material particles not having a glass transition temperature and mentioned above can be obtained by using a monomer which constitutes the organic matter illustrated above in combination with a crosslinking monomer and copolymerizing the monomers. Examples of the crosslinking monomer include monomers such as polyfunctional (meth)acrylates such as tetramethylene di(meth)acrylate, ethylene glycol di(meth)acrylate, polyethylene glycol di(meth)acrylate, polypropylene glycol (meth)acrylate, ethylene oxide di(meth)acrylate, tetraethylene oxide (meth)acrylate, 1,6-hexane di(meth)acrylate, neopentyl glycol di(meth)acrylate, 1,9-nonanediol di(meth)acrylate, trimeterol propane tri(meth)acrylate, tetramethylol methane di(meth)acrylate, tetramethylol methane tri(meth)acrylate, tetramethylol methane tetra(meth)acrylate, tetramethylol propane tetra(meth)acrylate, dipentaerythritol penta(meth)acrylate, glycerol di(meth)acrylate and glycerol tridi(meth)acrylate; polyfunctional vinyl monomers such as divinylbenzene and divinyltoluene; silane-containing monomers such as vinyltrimethoxysilane, trimethoxysilylstyrene and γ-(meth)acryloxypropyltrimethoxysilane; triallyl isocyanurate; diallyl phthalate; diallyl acrylamide; and diallyl ether. Many core material particles made of such hard organic materials are used especially in the COG (chip on glass) field.

The shapes of the core material particles are not particularly limited. The core material particles are generally in a spherical shape. However, the core material particles may be in shapes other than the spherical shape, for example, fiber shapes, hollow shapes, platy shapes or needle shapes, or may be in shapes having many projections on the surfaces thereof or indefinite shapes. In the present invention, spherical core material particles are preferable in that the spherical core material particles are excellent in the packing property, and easily cover metal.

Although the shapes of the electroconductive particles depends on the shape of the core material particles, the shapes of the electroconductive particles are not particularly limited. The electroconductive particles may be in, for example, fiber shapes, hollow shapes, platy shapes or needle shapes, or may be in shapes having many projections on the surfaces thereof or indefinite shapes. In the present invention, it is preferable that the electroconductive particles is in spherical shapes or shapes having projections on the surfaces in that the electroconductive particles are excellent in the packing property and connectivity. When the electroconductive particles are in a shape which having projections on the surface, the electroconductive particles preferably have a plurality of projections on the surfaces, and further preferably have a plurality of projections on spherical surfaces. When the electroconductive particles are in the shape having a plurality of projections, the core material particles may have a plurality of projections; or the core material particles may have no projections, and the metal films may have a plurality of projections. It is preferable that the core material particles have no projections, and the metal films have a plurality of projections.

When a triazole-based compound is disposed on outer surfaces of the metal films, the insulating layers have phosphonium groups, and the covered particles of the present invention is excellent in the adhesion of the insulating layers to the electroconductive particles, the covered particles of the present invention may have projections on the surfaces of the electroconductive particles to secure electrical continuity. The electroconductive particles have projections on the surfaces of the electroconductive particles. Therefore, when the electroconductive particles are compressed by an electrode at the time of practical use, the insulating layer can be effectively pushed away by the projections. When the height of the projections of the electroconductive particles is H, and the thickness of the insulating layers is L, H/L is preferably 0.1 or more from the viewpoint of eliminating the insulating layers at the time of practical use and securing electrical continuity. It is preferable that the H/L be 10 or less from the viewpoint of obtaining the packing property and the insulating property in directions different from the counter electrodes. The H/L is further still more preferably 0.2 or more and 5 or less from these viewpoints. When the insulating layers are the insulating particulates, the thickness L refers to the average particle size of the insulating particulates in these preferable ranges.

It is preferable that the average of the height of the projections H be 20 nm or more, and especially 50 nm or more. Although the number of the projections depends on the particle size of the electroconductive particles, it is preferable that the number of the projections be 1 to 20000, and especially 5 to 5000 per particle from the viewpoint of further improving the electroconductivity of the electroconductive particles. The aspect ratio of the projections is preferably 0.3 or more, and more preferably 0.5 or more. When the aspect ratio of the projections is high, an oxide film formed on the surface of an electrode can be advantageously broken through easily. The aspect ratio is a ratio of the height of the projections H to the length of the bases of the projections D, namely a value defined as H/D. The height of the projections H and the length of the bases of the projections D are average values obtained by measuring 20 different particles observed through an electron microscope, and the aspect ratio of the projections is a value obtained by calculating the aspect ratios of 20 different particles observed through the electron microscope and determining the average value thereof. The length of the bases D means the length of the bases of the projections along the surface of an electroconductive particle in an electron microscope image.

When the aspect ratio of the projections formed in the surfaces of the electroconductive particles is as mentioned above, it is preferable that the length of the bases of the projections D itself be 5 to 500 nm, and especially 10 to 400 nm, and it is preferable that the height of the projections H be 20 to 500 nm, and especially 50 to 400 nm.

When the insulating layers are insulating particulates, the projection portions may be insufficiently covered on the electroconductive particles having the projections on the surfaces. Since the triazole-based compound itself disposed on the outer surface of the metal films exhibits an insulating property, the insulating property of the electroconductive particles having the projections on the surfaces can be further enhanced in the covered particles of the present invention.

The metal films in electroconductive particles have electroconductivity. Examples of the constituent metal include metals such as gold, platinum, silver, copper, iron, zinc, nickel, tin, lead, antimony, bismuth, cobalt, indium, titanium, antimony, bismuth, germanium, aluminum, chromium, palladium, tungsten, and molybdenum or alloys thereof as well as metal compounds such as ITO and solder. Especially gold, silver, copper, nickel, palladium, or solder is preferable due to low resistance, and particularly nickel, gold, a nickel alloy or a gold alloy is suitably used due to high bondability with phosphonium groups in the insulating particulates. The metal in the electroconductive particles can be used alone or in combination of two or more.

The metal films may be monolayer structures, or may be laminated structures, which comprise a plurality of layers. When the metal films are laminated structures, which comprise a plurality of layers, the outermost layers are preferably nickel, gold, a nickel alloy, or a gold alloy. The amount of palladium in the outermost layers of the metal films is preferably small from the viewpoint of reducing the amount of expensive noble metal, the amount is preferably 5% by mass or less, and more preferably 1% by mass or less, and the outermost layers the most preferably contain no palladium.

The metal films may not cover all the surfaces of the core material particles, and may cover only parts thereof. When only parts of the surfaces of the core material particles are covered, the covered parts may be continuous, or, for example, the surfaces may be discontinuously covered in the shape of islands. Preferable examples of the thickness of the metal films include 0.001 μm or more and 2 μm or less.

Examples of the method for forming metal films on the surfaces of the core material particles include dry methods using vapor deposition, sputtering, a mechanochemical method, hybridization, and the like and wet methods using electrolytic plating, electroless plating, and the like. The metal films may be formed on the surfaces of the core material particles in combination of these methods.

The electroconductive particles have a triazole-based compound on the outer surfaces of the metal films. The triazole-based compound may be chemically bound to the metal on the surfaces of the electroconductive particles, or may not be bound. The triazole-based compound may exist on the surfaces of the electroconductive particles, and in that case, may exist on all the surfaces of the electroconductive particles, or may exist in only parts of the surfaces. The triazole-based compound may form layers covering parts or all of the surfaces of electroconductive particles. When the electroconductive particles have a triazole-based compound on the surfaces, the affinity for the insulating particulates having phosphonium groups increases.

Examples of the triazole-based compound include a compound having a nitrogen-containing heterocyclic structure with three nitrogen atoms in a five-membered ring.

Examples of the triazole-based compound include compounds having triazole single ring structures in which a triazole ring is not condensed with other rings as well as compounds having ring structures in which a triazole ring is condensed with other rings. Examples of the other rings include a benzene ring and a naphthalene ring.

Among others, the compounds having a ring structure in which a triazole ring and other rings are condensed are preferable due to excellent adhesion to the insulating layers, and especially benzotriazole-based compounds, which are compounds having structures in which a triazole ring and a benzene ring are condensed, are preferable.

Examples of the benzotriazole-based compounds include a compound represented by the following general formula (I).

[Formula 1]

(I)

wherein $R_{11}$ is a negative charge, a hydrogen atom, an alkali metal, an alkyl group which may be substituted, an amino group, a formyl group, a hydroxyl group, an alkoxy group, a sulfonic group, or a silyl group, and $R_{12}$, $R_{13}$, $R_{14}$, and $R_{15}$ are each independently a hydrogen atom, a halogen atom, an alkyl group which may be substituted, a carboxyl group, a hydroxyl group, or a nitro group.

Examples of the alkali metal represented by the Ru in formula (I) include lithium, sodium, and potassium. When the alkali metal represented by the $R_{11}$ is an alkali metal positive ion, and the Ra in formula (I) is an alkali metal, the bond between the $R_{11}$ and the nitrogen atom may be an ionic bond.

Examples of the alkyl groups represented by $R_{11}$, $R_{12}$, $R_{13}$, $R_{14}$ and $R_{15}$ in formula (I) include alkyl groups having 1 to 20 carbon atoms, and carbon numbers of 1 to 12 are particularly preferable. The alkyl groups may be substituted, and examples of the substituents include an amino group, alkoxy groups, a carboxyl group, a hydroxyl group, an aldehyde group, a nitro group, a sulfonic group, a quaternary ammonium group, a sulfonium group, a sulfonyl group, a phosphonium group, a cyano group, fluoroalkyl groups, a mercapto group, and halogen atoms.

Preferable examples of the alkoxy group represented by the $R_{11}$ include alkoxy groups having 1 to 12 carbon atoms.

The carbon numbers of the alkoxy groups as the substituents of the alkyl groups represented by $R_{12}$, $R_{13}$, $R_{14}$, and $R_{15}$ is preferably 1 to 12. Examples of the halogen atoms represented by $R_{12}$, $R_{13}$, $R_{14}$, and $R_{15}$ in formula (I) include a fluorine atom, a chlorine atom, a bromine atom, and an iodine atom.

Specific examples of the triazole-based compound include 1,2,3-triazole, 1,2,4-triazole, 3-amino-1H-1,2,4-triazole, 5-mercapto-1H-1,2,3-triazole sodium, 4-amino-3-hydrazino-5-mercapto-1,2,4-triazole, and 3-amino-5-mercapto-1,2,4-triazole as compounds having a triazole monocyclic structure, and additionally include benzotriazole, 1-methyl-1H-benzotriazole, 4-methyl-1H-benzotriazole, 5-methyl-1H-benzotriazole, 4-carboxy-1H-benzotriazole, 5-carboxy-1H-benzotriazole, 5-ethyl-1H-benzotriazole, 5-propyl-1H-benzotriazole, 5,6-dimethyl-1H-benzotriazole, 1-aminobenzotriazole, 5-nitrobenzotriazole, 5-chlorobenzotriazole, 4,5,6,7-tetrabromobenzotriazole, 1-hydroxybenzotriazole, 1-(methoxymethyl)-1H-benzotriazole, 1H-benzotriazole-1-methanol, 1H-benzotriazole-1-carboxyaldehyde, 1-(chloromethyl)-1H-benzotriazole, 1-hydroxy-6-(trifluoromethyl)benzotriazole, benzotriazole butyl ester, 4-carboxyl-1H-benzotriazole butyl ester, 4-carboxyl-1H-benzotriazole octyl ester, 1-[N,N-bis(2-ethylhexyl)-aminomethyl] methylbenzotriazole, 2,2'-[[(methyl-1H-benzotriazole-1-yl) methyl]imino]bisethanol, tetrabutyl phosphonium benzotriazolate, 1H-benzotriazole-1-yloxy-tris(dimethylamino)phosphonium hexafluorophosphate, 1H-benzotriazole-1-yloxy-tripyrrolidinophosphonium hexafluorophosphate, 1-(formamidemethyl)-1H-benzotriazole, 1-[bis (dimethylamino)methylene]-1H-benzotriazolium-3-oxide hexafluorophosphate, 1-[bis(dimethylamino)methylene]-1H-benzotriazolium-3-oxide tetrafluoroborate, (6-chloro-1H-benzotriazole-1-yloxy)tripyrrolidinophosphonium hexafluorophosphate, O-(benzotriazole-1-yl)-N,N,N',N'-bis (tetramethylene)uronium hexafluorophosphate, 0-(6-chlorobenzotriazole-1-yl)-N,N,N',N'-tetramethyluronium tetrafluoroborate, 0-(6-chlorobenzotriazole-1-yl)-N,N,N',N'-tetramethyluronium hexafluorophosphate, O-(benzotriazole-1-yl)-N,N,N',N'-bis(pentamethylene)uronium hexafluorophosphate, 1-(trimethylsilyl)-1H-benzotriazole, 1-[2-(trimethylsilyl)ethoxycarbonyloxy]benzotriazole, 1-(trifluoromethanesulfonyl)-1H-benzotriazole, (trifluoroacetyl)benzotriazole, tris(1H-benzotriazol-1-yl) methane, 9-(1H-benzotriazol-1-ylmethyl)-9H-carbazole, [(1H-benzotriazol-1-yl)methyl]triphenylphosphonium chloride, 1-(isocyanomethyl)-1H-benzotriazole, 1-[(9H-fluoren-9-ylmethoxy)carbonyloxy]benzotriazole, 1,2,3-benzotriazole sodium salt, and naphthotriazole, which have a ring structure in which a triazole ring and another ring are condensed.

In a method for manufacturing the below-mentioned preferable covered particles, the electroconductive particles may be surface-treated with a triazole-based compound to impart the triazole-based compound to the outer surfaces of the metal films of the electroconductive particles.

The average particle size of the electroconductive particles is preferably 0.1 μm or more and 50 μm or less, and more preferably 1 μm or more and 30 μm or less. When the average particle size of the electroconductive particles is in the above-mentioned range, the obtained covered particles easily secure the continuity between the counter electrodes without causing a short circuit in directions different from the direction between the counter electrodes. In the present invention, the average particle size of the electroconductive particles is the average value of particle sizes measured using a scanning electron microscope (SEM). When the electroconductive particles are spherical in a scanning electron microscope image, the particles sizes measured using the SEM are the diameters of circular electroconductive particle images. When the electroconductive particles are not spherical, the particles sizes measured using the SEM mean line segments having the largest length (the maximum length) of line segments across the images of electroconductive particles. This is the same also as to the average particle size of the below-mentioned insulating particulates. However, when the electroconductive particles have projections, the above-mentioned maximum lengths of portions other than the projections are averaged to obtain the average particle size.

The average particle size of electroconductive particles is specifically measured by the method described in Examples.

The insulating layers covering the electroconductive particles contain a compound having phosphonium groups. Therefore, the covered particles of the present invention have high adhesion to the electroconductive particles having a triazole-based compound as compared with the conventional insulating layers not having phosphonium groups but ammonium groups. For this reason, the covered particles of the present invention easily exhibit the effect of preventing a short circuit in directions different from the direction between the counter electrodes with the insulating layers, and improvement in the insulating property in the directions can be expected.

Examples of the insulating layers in the present invention include an insulating layer comprising a plurality of insulating particulates having phosphonium groups and disposed in the shape of a layer or a continuous insulating film having phosphonium groups.

First, the case where the insulating layer comprises insulating particulates and the particulates contain a compound having phosphonium groups will be described. In this case, when the insulating particulates melt, deform, exfoliate, or move on the surfaces of the electroconductive particles by subjecting the covered particles to thermocompression bonding between the electrodes, the metal surfaces of the electroconductive particles in portions subjected to thermocompression bonding are exposed. Therefore, continuity between the electrodes is enabled to obtain connectivity. Meanwhile, since the surface portions facing directions other than the thermocompression bonding direction in the covered particles are generally maintained with the surfaces of the electroconductive particles covered with insulating particulates, continuity in directions other than the thermocompression bonding direction is prevented.

When the insulating particulates contain the compound having phosphonium groups, the insulating particulates easily adhere to the electroconductive particles having a triazole-based compound on the surfaces. Therefore, while the rate at which the surfaces of the electroconductive particles are covered with the insulating particulates can be enough, the exfoliation of the insulating particulates from the electroconductive particles and the like are prevented effectively. For this reason, the effect of preventing a short circuit in directions different from the direction between the counter electrodes with the insulating particulates is easily exhibited, and improvement in the insulating property in the directions can be expected.

The covered particles of the present invention easily form a layer of the insulating particulates having a monolayer on the electroconductive particle surfaces since the insulating particulates having positive charges resulting from phosphonium groups repel each other. Therefore, when the covered particles of the present invention are used for an anisotropic electroconductive material or the like, defective continuity accompanying thermocompression bonding due to insulating particulates existing as multilayers is prevented effectively, and improvement in connectivity can be expected.

Therefore, connection reliability may be improved with the covered particles of the present invention having the insulating layers comprising the insulating particulates with phosphonium groups.

It is preferable that the insulating particulates have phosphonium groups on the surfaces thereof. Herein, if the insulating particulates have phosphonium groups, and it can be confirmed by scanning electron microscope observation that the insulating particulates adhere to the electroconductive particle surfaces, the case is applicable to the fact that the "insulating particulates have phosphonium groups on the surfaces".

The shapes of the insulating particulates are not particularly limited, and the shapes may be spherical, or may be shapes other than spherical shapes. Examples of the shapes other than spherical shapes include fiber shapes, hollow shapes, platy shapes or needle shapes. The insulating particulates may be in shapes having many projections on the surfaces thereof or indefinite shapes. Spherical insulating particulates are preferable from the viewpoints of adhesiveness to the electroconductive particles and ease of synthesis.

In the insulating particulates, the phosphonium groups preferably form parts of the chemical structure of a substance constituting the insulating particulates as parts of the substance. In the insulating particulates, the phosphonium groups are preferably contained in at least one structure of the constituent units of a polymer constituting the insulating particulates. The phosphonium groups are preferably chemically bound to the polymer constituting insulating particulates, and more preferably bound to side chains of the polymer.

A phosphonium groups is preferably represented by the following general formula (2).

[Formula 2]

(2)

wherein R may be mutually the same or different, and are each a linear, branched or cyclic alkyl or an aryl group, and * is a bonding hand.

Examples of the linear alkyl group represented by R include a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-icosyl group.

Examples of the branched alkyl group represented by the R include an isopropyl group, an isobutyl group, a s-butyl group, a t-butyl group, an isopentyl group, a s-pentyl group, a t-pentyl group, an iso hexyl group, s-hexyl group, t-hexyl group, and an ethylhexyl group.

Examples of the cyclic alkyl group represented by the R include cycloalkyl groups such as a cyclopropyl group, a cyclobutyl group, a cyclopentyl group, a cyclohexyl group, a cycloheptyl group, a cyclooctyl group and a cyclooctadecyl group.

Examples of the aryl group represented by the R include a phenyl group, a benzyl group, a tolyl group, and an o-xylyl group.

The R is preferably an alkyl group having 1 or more and 12 or less carbon atoms, more preferably an alkyl group having 1 or more and 10 or less carbon atoms, and the most preferably an alkyl group having 1 or more and 8 or less carbon atoms from the viewpoints that the adhesion between the electroconductive particles and the insulating particulates is enhanced, and insulating particulates are desorbed from the electroconductive particles, and continuity is easily secured when the insulating particulates are subjected to thermocompression bonding in an anisotropic electroconductive film. The R is also preferably a linear alkyl group from the viewpoint that the insulating particulates easily approach the electroconductive particles and stick to the electroconductive particles.

The polymer constituting the insulating particulates is preferably a polymer of a polymerizable compound having ethylenically unsaturated bonds. Examples of the polymerizable compound having ethylenically unsaturated bonds include styrenes, olefins, esters, α,β-unsaturated carboxylic acids, amides, and nitriles. Examples of the styrenes include styrene; nucleus-substituted styrenes such as o,m,p-methylstyrene, dimethylstyrene, ethylstyrene, and chlorostyrene; and styrene derivatives such as α-methylstyrene, α-chlorostyrene, and β-chlorostyrene. Examples of the olefins include ethylene and propylene. Examples of the esters include vinyl esters such as vinyl acetate, vinyl propionate, and vinyl benzoate; and esters of (meth)acrylic acid such as methyl (meth)acrylate, ethyl (meth)acrylate, propyl (meth) acrylate, and phenyl (meth)acrylate. Examples of the α,β-unsaturated carboxylic acids include acrylic acid, methacrylic acid, itaconic acid, and maleic acid. The salts of these α,β-unsaturated carboxylic acids are also included in the α,β-unsaturated carboxylic acids. Examples of the amides include acrylamide and methacrylamide. Examples of the nitriles include acrylonitrile. These may be further substituted, and examples of the substituent include a phosphonium group, an amino group, a quaternary ammonium group, an amide group, a sulfonium group, a sulfonic group, a thiol group, a carboxyl group, a phosphate group, a cyano group, an aldehyde group, an ester group, and a carbonyl group. These monomers can be used alone or in combination of two or more. The polymer constituting the insulating particulates is preferably a polymer of at least one selected from especially styrenes, esters and nitriles from the viewpoints that the rate of polymerization is high, and the polymer is easily formed spherically. When the polymer constituting the insulating particulates has a plurality of constituent units, those constituent units in the polymer may exist in the form of a random copolymer, an alternating copolymer, or a block copolymer. The polymer constituting the insulating particulates may be crosslinked, or may be uncrosslinked. When the polymer constituting the insulating particulates is crosslinked, and examples of the crosslinking agent include aromatic divinyl compounds such as divinylbenzene and divinylnaphthalene; and di(meth)acrylate compounds such as allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth)acrylate, 1,9-nonanediol di(meth)acrylate, 1,10-decanediol di(meth)acrylate, polyethylene glycol di(meth)acrylate, neopentyl glycol di(meth)acrylate, 1,6-hexanediol di(meth)acrylate, trimethylolpropane trimethacrylate, glycerin dimethacrylate, dimethylol tricyclodecane diacrylate, pentaerythritol tri(meth)acrylate, pentaerythritol tetraacrylate, dipentaerythritol hexaacrylate, neopentyl glycol acrylate benzoate, trimethylolpropane acrylate benzoate, 2-hydroxy-3-acryloyloxypropyl methacrylate, hydroxypivalate neopentyglycol diacrylate, ditrimethylolpropane tetraacrylate, and 2-butyl-2-ethyl-1,3-propanediol diacrylate.

When the insulating particulates are a polymer of polymerizable compounds having ethylenically unsaturated bonds, it is preferable that at least one of polymerizable compounds having ethylenically unsaturated bonds have phosphonium groups.

Examples of the polymerizable compound having phosphonium groups and having ethylenically unsaturated bonds include 4-(vinylbenzyl)triethyl phosphonium chloride, 4-(vinylbenzyl)trimethyl phosphonium chloride, 4-(vinylbenzyl)tributyl phosphonium chloride, 4-(vinylbenzyl)trioctyl phosphonium chloride, 4-(vinylbenzyl)triphenyl phosphonium chloride, 2-(methacryloyloxyethyl)trimethyl phosphonium chloride, 2-(methacryloyloxyethyl)triethyl phosphonium chloride, 2-(methacryloyloxyethyl)tributyl phosphonium chloride, 2-(methacryloyloxyethyl)trioctyl phosphonium chloride, and 2-(methacryloyloxyethyl)triphenyl phosphonium chloride. When the insulating particulates are a copolymer of the polymerizable compound having phosphonium groups and having ethylenically unsaturated bonds and the polymerizable compound not having phosphonium groups and having ethylenically unsaturated bonds, the polymerizable compound having phosphonium groups and the polymerizable compound not having phosphonium groups may be the same type or different types. Examples of the types mentioned here include the above-mentioned styrenes, olefins, esters, unsaturated carboxylic acids, amides, and nitriles. For example, at least one of the polymerizable compounds having phosphonium groups and having ethylenically unsaturated bonds and at least one of the polymerizable compound not having phosphonium groups and having ethylenically unsaturated bonds are the same type, for example, styrenes.

Especially the polymer constituting the insulating particulates preferably have a constituent unit represented by the following general formula (1) or general formula (3) from the viewpoint of ease of obtaining monomers or ease of polymer synthesis. Examples of R in the formula (1) and the formula (3) are as described above as the examples of R in the general formula (2). The phosphonium group may be bound to any position of the para position, the ortho position, and the meta position, and is preferably bound to the para position. In the formula (1) and the formula (3), suitable examples of the monovalent $An^-$ include halide ions. Examples of the halide ions include $Cl^-$, $F^-$, $Br^-$, and $I^-$.

[Formula 3]

(1)

wherein R may be mutually the same or different, and are each a linear, branched or cyclic alkyl or an aryl group, $An^-$ represents a monovalent anion, and m represents an integer of 0 to 5.

[Formula 4]

(3)

wherein R may be mutually the same or different, and are each a linear, branched or cyclic alkyl or an aryl group, $An^-$ represents a monovalent anion, n is a number of 1 to 5, and $R_5$ is a hydrogen atom or a methyl group.

In the above-mentioned general formula (1), m is preferably 0 to 2, more preferably 0 or 1, and particularly preferably 1. In the above-mentioned general formula (3), n is preferably 1 to 3, more preferably 1 to 2, and the most preferably 2.

In the polymer constituting the insulating particulates, the rate of constituent units to which the phosphonium groups are bound among all the constituent units is preferably 0.01% by mol or more and 5.0% by mol or less, and more preferably 0.02% by mol or more and 2.0% by mol or less. Here, the number of the constituent units in the polymer is defined with a structure derived from one ethylenic unsaturated bond counted as one constituent unit.

The polymer constituting the insulating particulates is a copolymer having two or more constituent units, and it is preferable that at least one of the constituent units have ester bonds in the structure. Therefore, the glass transition temperature of the polymer can easily be made suitably low, and the rate of an area in contact with the electroconductive particles in insulating particulates can be increased, the adhesion between the insulating particulates and the electroconductive particles can be enhanced, additionally the degree of the binding of the insulating particulates can be enhanced, and the insulation between the covered particles can be made higher.

Examples of the constituent unit having ester bonds in the structure include a constituent unit derived from a polymerizable compound having both ethylenic unsaturated bonds and ester bonds in the structure. Examples of such a polymerizable compound include above-mentioned esters, and specific examples thereof include vinyl esters such as vinyl propionate and vinyl benzoate; and esters of (meth)acrylic acid such as methyl (meth)acrylate, ethyl (meth)acrylate, propyl (meth)acrylate, butyl (meth)acrylate, hexyl (meth)acrylate, and phenyl (meth)acrylate. Especially the polymerizable compound having both ethylenic unsaturated bonds and ester bonds in the structure is preferably a compound having a group represented by —$COOR_1$ or —$OCOR_2$ ($R_1$ and $R_2$ are alkyl groups) in the structure. Especially a compound in which these groups are bound to $H_2C=CH*$ or $H_2C=C(CH_3)*$ (* is bound to a bonding hand in the above-mentioned group represented by —$COOR_1$ or —$OCOR_2$) is preferable. $R_1$ and $R_2$ are preferably linear or branched alkyl groups, $R_1$ and $R_2$ preferably have 1 or more and 12 or less carbon atoms, and more preferably 2 and more and 10 or less carbon atoms. These can be used alone or in combination of two or more.

In the polymer constituting the insulating particulates, the rate of the constituent units having ester bonds in the structures among all the constituent units is preferably 0.1% by mol or more and 30% by mol or less, and more preferably 1% by mol or more and 25% by mol or less from the viewpoints that the glass transition temperature of the insulating particulates is in a suitable range, and the insulating particulates generated when the polymerization reaction proceeds can be taken out without being melted by heat or adhering to the wall surface of a reaction vessel. A preferable example of the constituent units having ester bonds in the structures and mentioned here is represented, for example, by the following general formula (4).

[Formula 5]

(4)

wherein $R_3$ represents a hydrogen atom or a methyl group, and $R_4$ is a group represented by —$COOR_1$ or —$OCOR_2$.

The glass transition temperature of the insulating particulates is preferably lower than the glass transition temperature of the core materials of the electroconductive particles. When the covered particles are thus configured, the rate of an area in contact with the electroconductive particles in the insulating particulates and the adhesiveness of the insulating particulates can be easily enhanced.

Especially in the present embodiment, the use of the insulating particulates having phosphonium groups on the surface and the use of the insulating particulates having a low glass transition temperature as mentioned above when the insulating particulates can stick to the electroconductive particles as monolayers enables enhancing the adhesion of the insulating particulates to the electroconductive particles and the adhesiveness between the insulating particulates still more easily. Therefore, the insulation between covered particles can be improved effectively in the present embodiment.

More specifically, the glass transition temperature of the insulating particulates is preferably 100° C. or less, more preferably 95° C. or less, and particularly preferably 90° C. or less.

The glass transition temperature of the insulating particulates is preferably 40° C. or more, more preferably 45° C. or more, and particularly preferably 50° C. or more from the viewpoints of the shape stability of the covered particles at the time of storage and ease of synthesizing the insulating particulates. The glass transition temperature can be measured by the method described in the below-mentioned Examples.

When the core materials have a glass transition temperature, the difference between the glass transition temperature of the insulating particulates and the glass transition temperature of the core materials of the electroconductive particles is preferably 160° C. or less, more preferably 120° C. or less, and particularly preferably 100° C. or less from the same viewpoints as the above. The difference between the glass transition temperature of the insulating particulates and the glass transition temperature of the core materials of the electroconductive particles is preferably 5° C. or more, and more preferably 10° C. or more.

Examples of the method for measuring glass transition temperature include the following method.

The temperature of 0.04 to 0.06 g of a sample was raised to 200° C., and the sample was cooled from the temperature to 25° C. at a temperature decrease rate of 5° C./min using a differential scanning calorimeter, "STAR SYSTEM" (manufactured by METTLER TOLEDO). Subsequently, the temperature of the sample was raised at a temperature increase rate of 5° C./min, and the calorie was measured. When a peak was observed, the temperature at the peak was defined as glass transition temperature. When a level difference was observed without observing a peak, the temperature at the intersection point of the tangential line of a curve in the level difference portion exhibiting the maximum gradient and the extension of the baseline on the high temperature side of the level difference was defined as glass transition temperature.

The average particle size of the insulating particulates (D) is preferably 10 nm or more and 3,000 nm or less, and more preferably 15 nm or more and 2,000 nm or less. When the average particle size of the insulating particulates is in the above-mentioned range, the obtained covered particles easily secure the continuity between the counter electrodes without causing a short circuit in directions different from the direction between the counter electrodes. In the present invention, the average particle size of the insulating particulates is a value measured in observation using a scanning electron microscope, and is specifically measured by the method described in the below-mentioned Examples.

The particle size distribution of the insulating particulates measured by the above-mentioned method has a difference. The difference in the particle size distribution of powder is generally expressed by a coefficient of variation (hereinafter also described as "C. V.") formulated by the following expression (1).

C. V. (%)=(standard deviation/average particle size)×100 (1)

The fact that this C. V. is large indicates that the particle size distribution has a difference. Meanwhile, the fact that the C. V. is small indicates that the particle size distribution is sharp. In the covered particles of the present embodiment, the insulating particulates having a C. V. of preferably 0.1% or more and 20% or less, more preferably 0.5% or more and 15% or less, and the most preferably 1% or more and 10% or less are desirably used. When the C. V. is in this range, the thickness of the covering layers by insulating particulates can advantageously be uniformed.

The insulating layers may be continuous films comprising a polymer and having phosphonium groups instead of the insulating layers comprising the above-mentioned insulating particulates. When the insulating layers are continuous films containing a compound having phosphonium groups, the continuous films melt, deform or exfoliate by subjecting the covered particles to thermocompression bonding between the electrodes, the metal surfaces of the electroconductive particles are exposed thereby, this enables the continuity between the electrodes, and the connectivity is obtained. Especially when the continuous films are torn by subjecting the covered particles to thermocompression bonding between the electrodes, the metal surfaces are often exposed. Meanwhile, since the state in which the electroconductive particles are covered with the continuous films is generally maintained in the surface portions facing directions different from the thermocompression bonding direction in the covered particles, the continuity in directions other than the thermocompression bonding direction is prevented. The insulating films also preferably have phosphonium groups on the surfaces.

Also, even in the case where the insulating layers comprise continuous films, when the continuous films have phosphonium groups, the insulating continuous films easily stick to the electroconductive particles having a triazole-based compound on the surfaces. When the continuous films are formed by heating the insulating particulates as mentioned below, the insulating particulates which are the precursors of the insulating layers can be uniformly disposed. Therefore, there is the effect of enabling uniforming the film thickness of the films obtained by melting the insulating particulates. Even though the insulating layers comprise continuous films for these reasons, when the insulating layers have phosphonium groups, the effect of preventing a short circuit in directions different from the direction between the counter electrodes is easily exhibited, the insulation in the directions is improved, and the connection reliability is high. When the insulating layers is continuous films containing a compound having phosphonium groups, the films may cover the surfaces of the electroconductive particles wholly, and may cover the surfaces partially. The surfaces of the continuous films may be flat, or may have unevenness formed by heating the insulating particulates on the surfaces.

The thickness of the continuous films is preferably 10 nm or more from the viewpoint of improving insulation in directions different from the direction between the counter electrodes and preferably 3,000 nm or less from the viewpoint the ease of making the continuity between the counter electrodes. The thickness of the continuous films is preferably 10 nm or more and 3,000 nm or less, and more preferably 15 nm or more and 2,000 nm or less from these viewpoints.

The phosphonium groups preferably form parts of the chemical structure of a substance constituting the continuous films as the parts of the substance in the same way as the insulating particulates in the continuous films. In the continuous films, the phosphonium groups are preferably contained in at least one structure of the constituent units of the polymer constituting the continuous films. The phosphonium groups are preferably chemically bound to the polymer constituting the continuous films and more preferably bound to side chains of the polymer.

Examples of the phosphonium groups which the continuous films have include the same phosphonium groups as the phosphonium groups which the above-mentioned insulating particulates have.

Examples of the constituent units and the composition of the polymer constituting the continuous films include the same constituent units and composition as the above-mentioned examples of the constituent units and the composition of the polymer constituting the above-mentioned insulating particulates. Preferable rate ranges of the above-mentioned constituent units are all applied also to the continuous films. Examples of the glass transition temperature of the continuous films include the same glass transition temperature as the above-mentioned glass transition temperature of the insulating particulates. Examples of the relationship between the glass transition temperature of the continuous films and the glass transition temperature of the core material particles include the same relationship as the above-mentioned relationship between the glass transition temperature of the insulating particulates and the glass transition temperature of the core material particles.

When the insulating layers are continuous films, the continuous films are preferably continuous films obtained by covering the electroconductive particles with the insulating particulates having phosphonium groups on the surfaces thereof and then heating the insulating particulates. In this case, as mentioned above, the insulating particulates easily stick to the electroconductive particles, and while the rate at which the surfaces of the electroconductive particles are covered with the insulating particulates is enough thereby, the exfoliation of the insulating particulates from the electroconductive particles is easily prevented. As mentioned above, the insulating particulates having phosphonium groups easily cover the electroconductive particles as monolayers. The continuous films obtained by heating the insulating particulates covering the electroconductive particles can have a uniform thickness and a high covering rate on the surfaces of the electroconductive particles from these reasons.

Properly speaking, it is desirable to directly specifying the structures and the characteristics herein after all the structures and the characteristics of the continuous films obtained by heat-treating specific insulating particulates are measured using some means.

However, the structures and the characteristics of other continuous films related to effects of the present invention could not be confirmed at the skill level of the applicant at least at the time of application.

Even if all the factors were explained, the structures and the characteristics of the continuous films related to those factors would need to be identified by establishing new measuring methods, and markedly excessive economic expenditure and time would be required therefor.

Under the above-mentioned situation, the applicant disclosed that continuous films were manufactured by the above-mentioned manufacturing method as one of preferable characteristics of the continuous films in view of rapidity and the like being required from the viewpoint of the nature of patent application.

Subsequently, a suitable method for manufacturing the covered particles of the present embodiment will be described.

The present manufacturing method has a first step of polymerizing a polymerizable composition containing a polymerizable compound having phosphonium groups to obtain insulating particulates having phosphonium groups on the surfaces, a second step of imparting a triazole-based compound to the surfaces of the electroconductive particles, and a third step of mixing the insulating particulates with the electroconductive particles having a triazole-based compound on the surfaces to adhere the insulating particulates to the surfaces of the electroconductive particles.

Either of the first step and the second step may be performed before the other, and the first step and the second step may be performed simultaneously.

(First Step)

The above-mentioned polymerizable composition comprises two or more polymerizable compounds, and examples thereof include a polymerizable composition comprising at least one polymerizable compound having phosphonium groups. Examples of the polymerizable compound include a polymerizable compound which has ethylenic unsaturated bonds and is a constituent unit of a polymer constituting the above-mentioned insulating particulates. Examples of preferable polymerizable compounds and the constituent ratio therebetween include a polymerizable compound and a constituent ratio giving the above-mentioned preferable constituent units and preferable amount ratio therebetween of the polymer constituting the insulating particulates.

Examples of the polymerization method include emulsion polymerization, soap-free emulsion polymerization, dispersion polymerization, and suspension polymerization, and the polymerization method may be any thereof. However, the soap-free emulsion polymerization is preferable since the soap-free emulsion polymerization has the advantage of monodisperse particulates being able to be manufactured without using a surfactant. In the case of the soap-free emulsification polymerization, a water-soluble initiator is used as the polymerization initiator. It is preferable to perform polymerization in an inert atmosphere such as nitrogen or argon.

Insulating particulates having phosphonium groups on the surfaces are obtained by the above.

(Second Step)

Electroconductive particles are dispersed in a solution of a triazole-based compound and then filtered to obtain electroconductive particles having a triazole-based compound on the surfaces. Before treatment with the triazole-based compound, the electroconductive particles may be treated with another organic agent, and may be untreated.

Examples of the concentration of the triazole-based compound in the solution of the triazole-based compound in which the electroconductive particles are dispersed (solution containing the electroconductive particles) include 0.01% by mass or more and 10.0% by mass or less. Examples of the solvent in the solution of the triazole-based compound include water; alcohols such as methanol, ethanol, 1-propanol, 2-propanol, 1-butanol, 2-butanol, isobutyl alcohol, isopentyl alcohol, and cyclohexanol; ketones such as acetone, methyl isobutyl ketone, methyl ethyl ketone, and methyl n-butyl ketone; esters such as methyl acetate and ethyl acetate; ethers such as diethyl ether and ethylene glycol monoethyl ether; normal hexane; cyclohexanone; toluene; 1,4-dioxane; N,N-dimethylformamide; and tetrahydrofuran. It is preferable to disperse the electroconductive particles after the surface treatment dispersed and filtered in a solvent again to remove an excessive triazole-based compound.

(Third Step)

Subsequently, the insulating particulates are mixed with the electroconductive particles having the triazole-based compound on the surfaces to adhere the insulating particulates to the surfaces of the electroconductive particles. It is preferable to mix the insulating particulates with the electroconductive particles having the triazole-based compound on the surfaces in a liquid medium. Examples of the liquid medium include water and organic solvents, and a mixture thereof, and water is preferable.

When the insulating particulates are mixed with the electroconductive particles having the triazole-based compound on the surfaces in the liquid medium, a dispersion comprising these particles and the liquid medium preferably contains an inorganic salt, an organic salt, or an organic acid from the viewpoint that covered particles having a coverage of a certain value or more are easily obtained. As the inorganic salt, the organic salt, or the organic acid, an inorganic salt, an organic salt, or an organic acid dissociating negative ions is suitably used. As these negative ions, $Cl^-$, $F^-$, $Br^-$, $I^-$, $SO_4^{2-}$, $CO_3^{2-}$, $NO_3^-$, $COO^-$, $RCOO^-$ (R is an organic group), or the like is suitable. As the inorganic salt, for example, NaCl, KCl, LiCl, $MgCl_2$, $BaCl_2$, NaF, KF, LiF, $MgF_2$, $BaF_2$, NaBr, KBr, LiBr, $MgBr_2$, $BaBr_2$, NaI, KI, LiI, $MgI_2$, $BaI_2$, $Na_2SO_4$, $K_2SO_4$, $Li_2SO_4$, $MgSO_4$, $Na_2CO_3$, $NaHCO_3$, $K_2CO_3$, $KHCO_3$, $Li_2CO_3$, $LiHCO_3$, $MgCO_3$, $NaNO_3$, $KNO_3$, $LiNO_3$, $MgNO_3$, $BaNO_3$, or the like can be used. As the organic salt, Na succinate, Na oxalate, Na acetate, Na citrate, Na malonate, Na tartrate, Na fumarate, Na maleate, or the like can be used. As the organic acid, an amino acid such as glycine, succinic acid, oxalic acid, acetic acid, citric acid, tartaric acid, malonic acid, fumaric acid, maleic acid, or the like can be used.

Although preferable concentrations of the inorganic salt, the organic salt, and the organic acid vary depending on how large the covering area which the insulating particulates occupy in the surface area of the electroconductive particles is, covered particles which have a suitable coverage and in which the insulating particulates are monolayers are preferably obtained easily, for example, at a concentration of 5 mmol/L or more and 100 mmol/L or less in the dispersion containing the insulating particulates and the electroconductive particles. The concentrations of the inorganic salt, the organic salt, and the organic acid in the dispersion are more preferably 7 mmol/L or more and 90 mmol/L or less, and particularly preferably 10 mmol/L or more and 80 mmol/L or less from this viewpoint.

When the insulating particulates and the electroconductive particles are mixed in the liquid medium, the dispersion containing the insulating particulates may be mixed with the electroconductive particles, and the dispersion containing the electroconductive particles may be mixed with the insulating particulates, the insulating particulates and the electroconductive particles may be fed to the liquid medium, or the disperse medium containing the insulating particulates and the disperse medium containing electroconductive particles may be mixed. In the dispersion containing the electroconductive particles and the insulating particulates, the electroconductive particles are contained at preferably 100 ppm by mass or more and 100,000 ppm by mass or less, more preferably 500 ppm by mass or more and 80,000 ppm by mass or less.

In the dispersion containing the electroconductive particles and the insulating particulates, the insulating particulates are contained at preferably 10 ppm by mass or more and 50,000 ppm by mass or less, more preferably 250 ppm by mass or more and 30,000 ppm by mass or less.

Generally, the temperature of the dispersion containing the electroconductive particles and the insulating particulates is preferably 20° C. or more and 100° C. or less, and particularly preferably 40° C. or more and 90° C. or less from the viewpoint that covered particles having constant quality are easily obtained. Especially when the glass transition temperature of the insulating particulates is Tg° C., the temperature of the dispersion is preferably Tg−30° C. or more and Tg+30° C. or less, and more preferably Tg−15° C. or more and Tg+15° C. or less. When the temperature is in this range, it is preferable that the insulating particulates stick to the electroconductive particles while maintaining the shape thereof, and a suitable contact area is easily obtained between the insulating particulates and the electroconductive particles. However, the insulating particulates of the present invention having phosphonium groups have a high affinity for the electroconductive particles. Therefore, if the temperature is in the above-mentioned temperature range, the electroconductive particles can be fully covered with the insulating particulates.

In the dispersion after the electroconductive particles are mixed, time required for the adhesion of the insulating particulates to the electroconductive particles is preferably 0.1 hour or more and 24 hours or less. It is preferable to stir the dispersion during this time. Subsequently, the solid content of the dispersion is washed and dried as necessary to obtain the covered particles in which the insulating particulates having phosphonium groups adhere to the surfaces of the electroconductive particles.

As mentioned above, heating the covered particles in which the insulating particulates adhere to the surfaces of the electroconductive particles enables melting the insulating particulates and covering the surfaces of the electroconductive particles in the shape of films. Forming the insulating particulates into the shape of films further strengthens the insulating property. Examples of the heating method include a method for warming a dispersion after the insulating particulates are adhered to the surfaces of the electroconductive particles, a method of warming the covered particles in a solvent such as water, and a method for warming the covered particles in a gaseous phases such as an inert gas. When the glass transition temperature of the polymer constituting the insulating particulates is Tg, the heating temperature is preferably Tg+1° C. or more and Tg+60° C. or less, more preferably Tg+5° C. or more and Tg+50° C. or less, and the most preferably more than Tg+15° C. from the viewpoint that the insulating particulates easily form uniform films without falling off. When the covered particles are warmed in the gaseous phase, the covered particles can be warmed under the pressure condition of atmospheric pressure, reduced pressure, or increased pressure.

The covered particles in which the surfaces of the electroconductive particles are covered in the shape of films may be subjected to annealing treatment to further stabilize the continuous films. Examples of the method for annealing treatment include a method for warming the covered particles in a gaseous phase such as inert gas. When the glass transition temperature of the polymer constituting the insulating particulates is Tg, the heating temperature is preferably Tg+1° C. or more and Tg+60° C. or less, and more preferably Tg+5° C. or more and Tg+50° C. or less. The heating atmosphere is not particularly limited, and the covered particles can be heated in an inert gas atmosphere such as nitrogen and argon or an oxidizing atmosphere such as air under any condition of atmospheric pressure, reduced pressure, or increased pressure.

Although a preferable manufacturing method was described above, the covered particles of the present invention can be manufactured by other manufacturing methods. For example, phosphonium groups may be introduced into the surfaces of the insulating particulates by manufacturing the insulating particulates not having phosphonium groups beforehand by polymerization reaction, reacting the obtained insulating particulates with a compound having phosphonium groups, and the like.

The covered particles obtained as the above are suitably used as electroconductive materials such as electroconductive adhesives, anisotropic electroconductive films, and anisotropic electroconductive adhesives by making the most of the insulating property between the covered particles and the connectivity between the counter electrodes by an advantage obtained by combining the electroconductive particles having a triazole-based compound on the surfaces with the insulating particulates or the continuous films having phosphonium group.

EXAMPLES

The present invention will be described by Examples hereinafter. However, the scope of the present invention is not limited to these Examples. Characteristics in examples were measured by the following methods.

(1) Average Particle Size

Two hundred particles were arbitrarily sampled from a scanning electron microscope (SEM) photograph to be measured (a magnification of 100,000 times), the particle sizes thereof were measured, and the average value thereof was defined as the average particle size. The definition of the average particle size is as mentioned above.

(2) C.V. (Coefficient of Variation)

The C. V. was calculated by the following expression from the measurement of the average particle size.

C. V. (%)=(standard deviation/average particle size)×100

(3) Glass Transition Temperature

The calorie change at a rate of temperature increase and decrease of 5° C./min in a nitrogen atmosphere at measurement temperatures of 25° C. to 200° C. was measured with a differential scanning calorimetry device (manufactured by METTLER TOLEDO, STAR SYSTEM) by the above-mentioned procedure.

Example 1

[Manufacturing of Phosphonium-Containing Insulating Particulates]

First, 100 mL of pure water was fed to a 200-mL four-necked flask in which stirring blades having a length of 60 mm was installed. Then, 30.00 mmol of a styrene monomer (manufactured by KANTO CHEMICAL CO., INC.), 5.3 mmol of n-butyl acrylate (manufactured by KANTO CHEMICAL CO., INC.), 0.30 mmol of 4-(vinylbenzyl)triethyl phosphonium chloride (manufactured by NIPPON CHEMICAL INDUSTRIAL CO., LTD.), and 0.50 mmol of 2,2'-azobis(2-methylpropionamidine)dihydrochloride (manufactured by Wako Pure Chemical Industries, Ltd., V-50) as a polymerization initiator were fed. The mixture was flushed with nitrogen for 15 minutes, dissolved oxygen was expelled, the temperature was then raised to 60° C. and maintained for 6 hours, and the polymerization reaction was advanced. The dispersion of the particulates after polymerization was passed through a SUS sieve having an aperture of 150 μm, and the aggregate was removed. The dispersion from which the aggregate was removed was centrifuged with a centrifuge (manufactured by Hitachi Koki Co., Ltd., CR-21N) under the conditions of 20,000 rpm and 20 minutes, and the particulates were sedimented, and the supernatant was removed. Pure water was added to the obtained solid, and the solid was washed to obtain spherical particulates of poly(styrene/n-butyl acrylate/4-(vinylbenzyl)triethyl phosphonium chloride). The average particle size of the obtained particulates was 86 nm, and the C. V. was 7.4%. The glass transition temperature was around 62° C.
[Manufacture of Insulating Particulate-Covered Electroconductive Particles]

Figure 1:
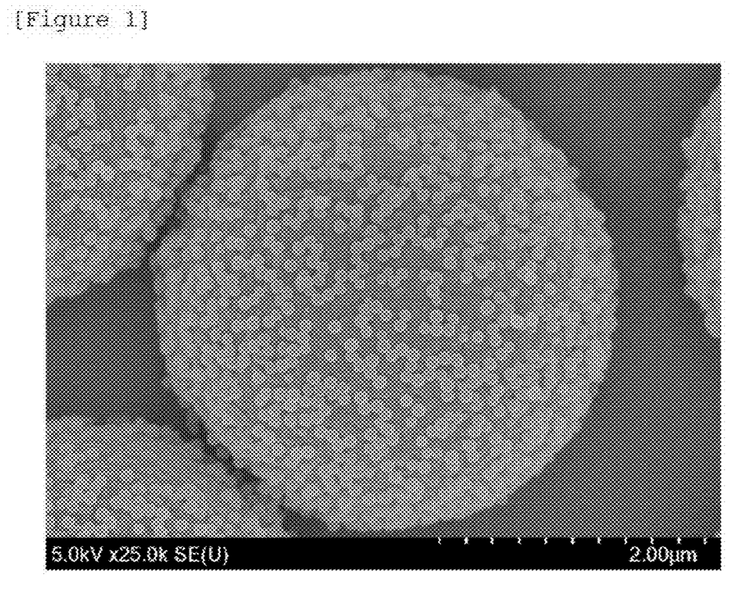
FIG. 1 is a photograph taken by observing covered particles obtained in Example 1 through a scanning electron microscope (SEM).

Ni-plated particles having 0.125-μm-thick nickel films on the surfaces of spherical resin particles and an average particle size of 3 μm (manufactured by NIPPON CHEMICAL INDUSTRIAL CO., LTD.) were provided. The resin particles comprised a crosslinking acrylic resin, and the glass transition temperature was 120° C. Then, 100 mL of pure water was fed to 5.0 g of the Ni-plated particles, and the mixture was stirred to obtain a dispersion of the Ni-plated particles. Next, 10 mL of an aqueous 1% by mass benzotriazole solution was fed to this dispersion, and the mixture was stirred for 5 minutes to perform the surface treatment. Then, the mixture was filtered through a membrane filter having an aperture of 2.0 μm to collect Ni-plated particles having benzotriazole layers on the surfaces. The collected Ni-plated particles were washed with pure water, and 100 mL of pure water was then fed to obtain a dispersion of the Ni-plated particles having benzotriazole layers on the surfaces. The insulating particulates obtained above and $Na_2SO_4$ were fed to this dispersion, and this was stirred at 40° C. for 30 minutes. After the insulating particulates and the $Na_2SO_4$ were fed, the solid concentration of the insulating particulates was 10,000 ppm by mass, and the concentration of $Na_2SO_4$ were 5 mmol/L in the dispersion. The supernatant was removed, the resultant was then washed with pure water and then vacuum-dried at 50° C. to obtain insulating particulate-covered electroconductive particles. The coverage of the insulating particulates in the obtained covered particles was determined by the following method. Table 1 shows the result. FIG. 1 shows an SEM photograph of the obtained covered particles.

Example 2

[Manufacturing of Phosphonium-Containing Insulating Particulates]
Insulating particulates were obtained by the same method as in Example 1.
[Manufacturing of Insulating Particulate-Covered Electroconductive Particles]

Ni-plated particles having an average particle size of 3 μm and 0.125-μm-thick nickel films having 1,030 projections with an average height of 0.1 μm, an average base length of 0.197 μm and an aspect ratio of 0.5 on the surfaces of spherical resin particles (manufactured by NIPPON CHEMICAL INDUSTRIAL CO., LTD.) were provided. The resin particles comprised a crosslinking acrylic resin and had a glass transition temperature of 120° C. Then, 100 mL of pure water was fed to 5.0 g of the Ni-plated particles, and the mixture was stirred to obtain a dispersion of the Ni-plated particles. Next, 10 mL of an aqueous 1% by mass solution of benzotriazole was fed to this dispersion, the mixture was stirred for 5 minutes to perform the surface treatment. Subsequently, the mixture was filtered through a membrane filter having an aperture of 2.0 μm to collect Ni-plated particles having benzotriazole layers on the surfaces. The collected Ni-plated particles were washed with pure water, and 100 mL of pure water was then fed to obtain a dispersion of the Ni-plated particles having benzotriazole layers on the surfaces. The insulating particulates obtained above and $Na_2SO_4$ were fed to this dispersion, and this was stirred at 40° C. for 30 minutes. After the insulating particulates and the $Na_2SO_4$ were fed, the solid concentration of the insulating particulates was 10,000 ppm by mass, and the concentration of $Na_2SO_4$ were 5 mmol/L in the dispersion. The supernatant was removed, the resultant was then washed with pure water and then vacuum-dried at 50° C. to obtain insulating particulate-covered electroconductive particles. The coverage of the insulating particulates in the obtained covered particles was determined by the following method. Table 1 shows the result.

Example 3

[Manufacturing of Phosphonium-Containing Insulating Particulates]
Insulating particulates were obtained by the same method as in Example 1.
[Manufacture of Insulating Particulate-Covered Electroconductive Particles]
The procedure was performed by the same method as in Example 1 except that 10 mL of an aqueous 1% by mass solution of 4-carboxy-1H-benzotriazole was fed to the dispersion of the Ni-plated particles to perform the surface treatment. The coverage of the insulating particulates in the obtained covered particles was determined by the following method. Table 1 shows the result.

Example 4

[Manufacturing of Phosphonium-Containing Insulating Particulates]
Insulating particulates were obtained by the same method as in Example 1.
[Manufacture of Insulating Particulate-Covered Electroconductive Particles]
The procedure was performed by the same method as in Example 2 except that 10 mL of an aqueous 1% by mass solution of 4-carboxy-1H-benzotriazole was fed to the dispersion of the Ni-plated particles to perform the surface treatment. The coverage of the insulating particulates in the obtained covered particles was determined by the following method. Table 1 shows the result.

Example 5

Figure 2:
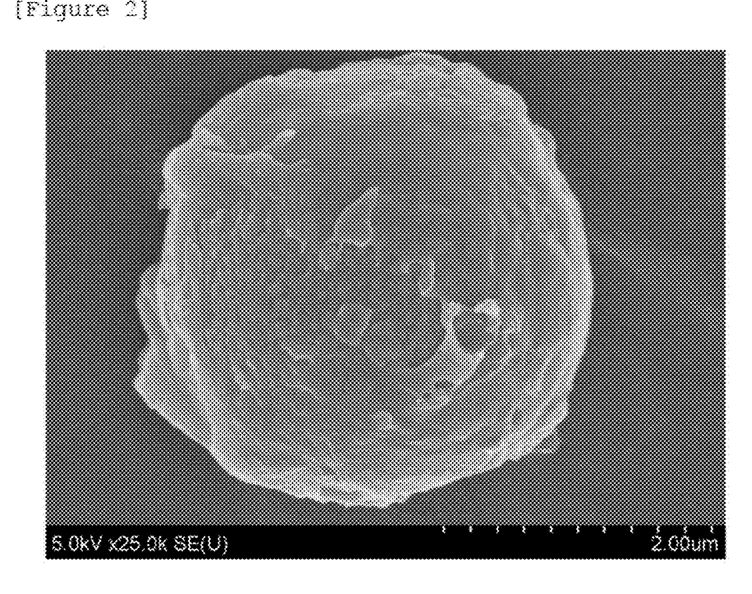
FIG. 2 is a photograph taken by observing a covered particle obtained in Example 5 through a scanning electron microscope (SEM).

1.0 g of the insulating particulate-covered electroconductive particles obtained in Example 1 was added to 20 mL of pure water to prepare a dispersion, and the dispersion were stirred at 95° C. for 6 hours. After stirring, solid matter was separated on a membrane filter having an aperture of 2 μm and dried to obtain covered particles covered with insulating layers comprising continuous films having a maximum thickness of 50 nm and a minimum thickness of 20 nm. FIG. 2 shows a SEM photograph of an obtained covered particle.

Example 6

[Manufacturing of Phosphonium-Containing Insulating Particulates]
100 mL of pure water was fed to a 200-mL four-necked flask in which stirring blades having a length of 60 mm was installed. Then, 15.0 mmol of divinylbenzene monomer (manufactured by NIPPON STEEL CORPORATION) as a crosslinking monomer; 30.00 mmol of a styrene monomer (manufactured by KANTO CHEMICAL CO., INC.), 5.3 mmol of n-butyl acrylate (manufactured by KANTO CHEMICAL CO., INC.), and 0.03 mmol of 4-(vinylbenzyl)

triethyl phosphonium chloride (manufactured by Nippon Steel & Sumitomo Metal Corporation) as non-crosslinking monomers; and 0.50 mmol of 2,2'-azobis(2-methylpropionamidine)dihydrochloride (manufactured by Wako Pure Chemical Industries, Ltd., V-50) as a polymerization initiator were fed. The mixture was flushed with nitrogen for 15 minutes, dissolved oxygen was expelled, the temperature was then raised to 60° C. and maintained for 6 hours, and the polymerization reaction was advanced. The dispersion of the particulates after polymerization was passed through a SUS sieve having an aperture of 150 μm, and the aggregate was removed. The dispersion from which the aggregate was removed was centrifuged with a centrifuge (manufactured by Hitachi Koki Co., Ltd., CR-21N) under the conditions of 20,000 rpm and 20 minutes, and the particulates were sedimented, and the supernatant was removed. Pure water was added to the obtained solid, and the solid was washed to obtain spherical particulates of poly(styrene/divinylbenzene/n-butyl acrylate/4-(vinylbenzyl)triethyl phosphonium chloride). The average particle size of the obtained particulates was 220 nm, and the C. V. was 9.7%.

[Manufacturing of Insulating Particulate-Covered Electroconductive Particles]

Insulating particulate-covered electroconductive particles were obtained by the same method as Example 1. The coverage of the insulating particulates in the obtained covered particles was determined by the following method. Table 1 shows the result.

Comparative Example 1

[Manufacturing of Ammonium-Containing Insulating Particulates]

First, 100 mL of pure water was fed to a 200-mL four-necked flask in which stirring blades having a length of 60 mm was installed. Then, 30.00 mmol of a styrene monomer (manufactured by KANTO CHEMICAL CO., INC.), 5.3 mmol of n-butyl acrylate (manufactured by KANTO CHEMICAL CO., INC.), 0.30 mmol of 4-(vinylbenzyl)triethyl ammonium chloride (manufactured by NIPPON CHEMICAL INDUSTRIAL CO., LTD.), and 0.50 mmol of 2,2'-azobis(2-methylpropionamidine)dihydrochloride (manufactured by Wako Pure Chemical Industries, Ltd., V-50) as a polymerization initiator were fed. The mixture was flushed with nitrogen for 15 minutes, dissolved oxygen was expelled, the temperature was then raised to 60° C. and maintained for 6 hours, and the polymerization reaction was advanced. The dispersion of the particulates after the polymerization was passed through a SUS sieve having an aperture of 150 μm, and the aggregate was removed. The dispersion from which the aggregate was removed was centrifuged with a centrifuge (manufactured by Hitachi Koki Co., Ltd., CR-21N) under the conditions of 20,000 rpm and 20 minutes, and the particulates were sedimented, and the supernatant was removed. Pure water was added to the obtained solid, and the solid was washed to obtain spherical particulates of poly(styrene/n-butyl acrylate/4-(vinylbenzyl)triethyl ammonium chloride). The average particle size of the obtained particulates was 90 nm, and the C. V. was 8.6%. The glass transition temperature was around 59° C.

[Manufacturing of Insulating Particulate-Covered Electroconductive Particles]

Ni-plated particles having 0.125-μm-thick nickel films on the surfaces of spherical resin particles and an average particle size of 3 μm (manufactured by NIPPON CHEMICAL INDUSTRIAL CO., LTD.) were provided. The resin particles comprised a crosslinking acrylic resin, and the glass transition temperature was 120° C. Then, 100 mL of pure water was fed to 5.0 g of the Ni-plated particles, and the mixture was stirred to obtain a dispersion of the Ni-plated particles. Next, 10 mL of an aqueous 1% by mass benzotriazole solution was fed to this dispersion, and the mixture was stirred for 5 minutes to perform the surface treatment. Then, the mixture was filtered through a membrane filter having an aperture of 2.0 μm to collect Ni-plated particles having benzotriazole layers on the surfaces. The collected Ni-plated particles were washed with pure water, and 100 mL of pure water was then fed to obtain a dispersion of the Ni-plated particles having benzotriazole layers on the surfaces. The insulating particulates obtained above and Na$_2$SO$_4$ were fed to this dispersion, and the mixture was stirred at 40° C. for 30 minutes. After the insulating particulates and the Na$_2$SO$_4$ were fed, the solid concentration of the insulating particulates was 10,000 ppm by mass, and the concentration of Na$_2$SO$_4$ were 5 mmol/L in the dispersion. The supernatant was removed, the resultant was then washed with pure water and then vacuum-dried at 50° C. to obtain insulating particulate-covered electroconductive particles. The coverage of the insulating particulates in the obtained covered particles was determined by the following method. Table 1 shows the result.

Comparative Example 2

[Manufacturing of Phosphonium-Containing Insulating Particulates]

Insulating particulates were obtained by the same method as in Example 1.

[Manufacturing of Insulating Particulate-Covered Electroconductive Particles]

In Example 1, the surface treatment with a benzotriazole solution was not performed. In detail, Ni-plated particles having 0.125-μm-thick nickel films on the surfaces of spherical resin particles and an average particle size of 3 μm (manufactured by NIPPON CHEMICAL INDUSTRIAL CO., LTD.) were provided. The resin particles comprised a crosslinking acrylic resin, and the glass transition temperature was 120° C. Then, 100 mL of pure water was then fed to 5.0 g of the Ni-plated particles, and the mixture was stirred to obtain a dispersion of the Ni-plated particles. The phosphonium-containing insulating particulates obtained in Example 1 and Na$_2$SO$_4$ were fed to this dispersion, and the mixture was stirred at 40° C. for 30 minutes. After the insulating particulates and the Na$_2$SO$_4$ were fed, the solid concentration of the insulating particulates was 10,000 ppm by mass, and the concentration of Na$_2$SO$_4$ were 5 mmol/L in the dispersion. The supernatant was removed, the resultant was then washed with pure water and then vacuum-dried at 50° C. to obtain insulating particulate-covered electroconductive particles. The coverage of the insulating particulates in the obtained covered particles was determined by the following method. Table 1 shows the result.

Comparative Example 3

[Manufacturing of Ammonium-Containing Insulating Particulates]

Insulating particulates were obtained by the same method as in Comparative Example 1.

[Manufacture of Insulating Particulate-Covered Electroconductive Particles]

In Comparative Example 1, the surface treatment with a benzotriazole solution was not performed. In detail, Ni-plated particles having 0.125-μm-thick nickel films on the surfaces of spherical resin particles and an average particle size of 3 μm (manufactured by NIPPON CHEMICAL INDUSTRIAL CO., LTD.) were provided. The resin particles comprised a crosslinking acrylic resin, and the glass transition temperature was 120° C. Then, 100 mL of pure water was then fed to 5.0 g of the Ni-plated particles, and the mixture was stirred to obtain a dispersion of the Ni-plated particles. The ammonium-containing insulating particulates obtained in Comparative Example 1 and $Na_2SO_4$ were fed to this dispersion, and the mixture was stirred at 40° C. for 30 minutes. After the insulating particulates and the $Na_2SO_4$ were fed, the solid concentration of the insulating particulates was 10,000 ppm by mass, and the concentration of $Na_2SO_4$ were 5 mmol/L in the dispersion. The supernatant was removed, the resultant was then washed with pure water and then vacuum-dried at 50° C. to obtain insulating particulate-covered electroconductive particles. The coverage of the insulating particulates in the obtained covered particles was determined by the following method. Table 1 shows the result.

Comparative Example 4

[Manufacturing of Phosphonium-Containing Insulating Particulates]

Insulating particulates were obtained by the same method as in Example 1.

[Manufacturing of Insulating Particulate-Covered Electroconductive Particles]

In Example 2, the surface treatment with a benzotriazole solution was not performed. In detail, Ni-plated particles having an average particle size of 3 μm and 0.125-μm-thick nickel films having 1,030 projections with an average height of 0.1 μm, an average base length of 0.197 μm and an aspect ratio of 0.5 on the surfaces of spherical resin particles (manufactured by NIPPON CHEMICAL INDUSTRIAL CO., LTD.) were provided. The resin particles comprised a crosslinking acrylic resin, and the glass transition temperature was 120° C. Then, 100 mL of pure water was then fed to 5.0 g of the Ni-plated particles, and the mixture was stirred to obtain a dispersion of the Ni-plated particles. The insulating particulates obtained in Example 1 and $Na_2SO_4$ were fed to this dispersion, and this was stirred at 40° C. for 30 minutes. After the insulating particulates and the $Na_2SO_4$ were fed, the solid concentration of the insulating particulates was 10,000 ppm by mass, and the concentration of $Na_2SO_4$ were 5 mmol/L in the dispersion. The supernatant was removed, the resultant was then washed with pure water and then vacuum-dried at 50° C. to obtain insulating particulate-covered electroconductive particles. The coverage of the insulating particulates in the obtained covered particles was determined by the following method. Table 1 shows the result.

Reference Example 1

Reference Example 1 is for comparing the evaluations of conductivity and the insulating property of covered particles at the same coverage as Comparative Example 4.

[Manufacturing of Phosphonium-Containing Insulating Particulates]

Insulating particulates were obtained by the same method as in Example 1.

[Manufacture of Insulating Particulate-Covered Electroconductive Particles]

Ni-plated particles having an average particle size of 3 μm and 0.125-μm-thick nickel films having 1,030 projections with an average height of 0.1 μm, an average base length of 0.197 μm and an aspect ratio of 0.5 on the surfaces of spherical resin particles (manufactured by NIPPON CHEMICAL INDUSTRIAL CO., LTD.) were provided. The resin particles comprised a crosslinking acrylic resin, and the glass transition temperature was 120° C. Then, 100 mL of pure water was then fed to 5.0 g of the Ni-plated particles, and the mixture was stirred to obtain a dispersion of the Ni-plated particles. Next, 10 mL of an aqueous 1% by mass benzotriazole solution was fed to this dispersion, and the mixture was stirred for 5 minutes to perform the surface treatment. Then, the mixture was filtered through a membrane filter having an aperture of 2.0 μm to collect Ni-plated particles having benzotriazole layers on the surfaces. The collected Ni-plated particles were washed with pure water, and 100 mL of pure water was then fed to obtain a dispersion of the Ni-plated particles having benzotriazole layers on the surfaces. The insulating particulates obtained above and $Na_2SO_4$ were fed to this dispersion, and this was stirred at 40° C. for 30 minutes. After the insulating particulates and $Na_2SO_4$ were fed, the solid concentration of the insulating particulates was 4,000 ppm by mass, and the concentration of $Na_2SO_4$ was 5 mmol/L in the dispersion. The supernatant was removed, the resultant was then washed with pure water and then vacuum-dried at 50° C. to obtain insulating particulate-covered electroconductive particles. The coverage of the insulating particulates in the obtained covered particles was determined by the following method. Table 1 shows the result.

(Evaluation of Coverage)

The differences in the coverages of the covered particles obtained in Example 1 to Example 6, Comparative Example 1 to Comparative Example 4, and Reference Example 1 were evaluated. The coverage was calculated by the following method.

Method for Measuring Coverage

Example 1 to Example 4, Example 6, Comparative Example 1 to Comparative Example 4, and Reference Example 1

The number of insulating particulates when the insulating particulates were arranged in the closest packing on the surfaces of Ni-plated particles N was calculated by the following expression.

$$N=4\pi(R+r)^2/2\sqrt{3}r^2$$

(R: Radius of Ni-plated particles (nm), r: Radius of insulating particulates (nm))

The number of the insulating particulates adhering to the Ni-plated particles n was counted by an SEM, and the coverage was calculated from the following expression.

$$\text{Coverage (\%)}=(n/N)\times 100$$

The coverage used for evaluation was the average value of 20 Ni-plated particles.

Example 5

The reflected electronic composition (COMPO) image of an SEM photograph image of the covered particles was captured on an automatic image analyzer (manufactured by NIRECO CORPORATION, LUZEX (registered trademark) AP), and the coverage was calculated by considering 20 covered particles in the COMPO image as objects.

TABLE 1

| | Insulating particulate | Surface treatment | Coverage (%) |
|---|---|---|---|
| Example 1 | Poly(styrene/n-butyl acrylate/4-(vinylbenzyl)triethyl phosphonium chloride) | Benzotriazole | 47.9 |
| Example 2 | Poly(styrene/n-butyl acrylate/4-(vinylbenzyl)triethyl phosphonium chloride) | Benzotriazole | 55.0 |
| Example 3 | Poly(styrene/n-butyl acrylate/4-(vinylbenzyl)triethyl phosphonium chloride) | 4-Carboxy-1H-benzotriazole | 59.0 |
| Example 4 | Poly(styrene/n-butyl acrylate/4-(vinylbenzyl)triethyl phosphonium chloride) | 4-Carboxy-1H-benzotriazole | 60.4 |
| Example 5 | Poly(styrene/n-butyl acrylate/4-(vinylbenzyl)triethyl phosphonium chloride) | Benzotriazole | 75.0 |
| Example 6 | Poly(styrene/divinyl-benzene/n-butyl acrylate/4-(vinylbenzyl)triethyl phosphonium chloride) | Benzotriazole | 48.0 |
| Comparative Example 1 | Poly(styrene/n-butyl acrylate/4-(vinylbenzyl)triethyl ammonium chloride) | Benzotriazole | 22.3 |
| Comparative Example 2 | Poly(styrene/n-butyl acrylate/4-(vinylbenzyl)triethyl phosphonium chloride) | No treatment | 18.4 |
| Comparative Example 3 | Poly(styrene/n-butyl acrylate/4-(vinylbenzyl)triethyl ammonium chloride) | No treatment | 4.9 |
| Comparative Example 4 | Poly(styrene/n-butyl acrylate/4-(vinylbenzyl)triethyl phosphonium chloride) | No treatment | 18.0 |
| Reference Example 1 | Poly(styrene/n-butyl acrylate/4-(vinylbenzyl)triethyl phosphonium chloride) | Benzotriazole | 18.2 |

As shown in Table 1, when insulating particulates having ammonium groups are used as insulating layers like conventional technology, the difference in the coverage between the case where the electroconductive particles do not have a triazole-based compound (Comparative Example 3) and the case where the electroconductive particles have a triazole-based compound (Comparative Example 1) is 22.3−4.9=17.4%. When electroconductive particles not having a triazole-based compound are used, the difference in the coverage between the case where the insulating particulates have phosphonium groups (Comparative Example 2) and the case where the insulating particulates have ammonium groups (Comparative Example 3) is 18.4−4.9=13.5%.

Meanwhile, the difference in the coverage between the case where the insulating particulates have phosphonium groups, and the electroconductive particles have a triazole-based compound (Example 1) and Comparative Example 3 is 47.9−4.9=43%. This is still larger than 30.9% which is the total value of 13.5% which is the difference between Comparative Example 3 and Comparative Example 2 and 17.4% which is the difference between Comparative Example 3 and Comparative Example 1.

The electroconductive particles of the present invention also exhibited a good coverage when the electroconductive particles had many projections on the surfaces.

It is found from the above that, in covered particles in which electroconductive particles are covered with insulating layers, imparting a triazole-based compound to the surfaces of the electroconductive particles and imparting phosphonium groups to the insulating layers improve the adhesion between the electroconductive particles and the insulating layers synergistically.

(Evaluation of Conductivity and Insulating Property)

The conductivity and the insulating property were evaluated by the following methods using the covered particles of Example 2, Comparative Example 4, and Reference Example 1.

<Evaluation of Conductivity>

An insulating adhesive obtained by mixing 100 parts by mass of an epoxy resin, 150 parts by mass of a hardening agent and 70 parts by mass of toluene was mixed with 15 part by mass of each of the covered particles obtained in Example 2 and Comparative Example 4 to obtain an insulating paste. This paste was applied to a siliconized polyester film using a bar coater, and the paste was then dried to form a thin film on the film. The obtained thin film-formed film was disposed between a glass substrate in which aluminum was vapor-deposited on the whole surface and a polyimide film substrate on which the copper pattern was formed at a pitch of 50 μm, and the electric connection was made. The conductivity of the covered particles was evaluated at room temperature (25° C., 50% RH) by measuring the continuity resistance between these substrates. It can be estimated that as the resistance value becomes lower, the conductivity of the covered particles becomes higher. When the resistance value is less than 2Ω, the conductivity of covered particles was rated as "very good" (shown by the symbol "◯" in Table 2). When the resistance value is 2Ω or more and less than 5Ω, the conductivity of covered particles was rated as "good" (shown by the symbol "Δ" in Table 2). When the resistance value is 5 Ω or more, the conductivity of covered particles was rated as "poor" (shown by the symbol "x" in Table 2). Table 2 shows the results.

[Evaluation of Insulating Property]

20 covered particles were considered as objects, the covered particles of each of Example 2 and Comparative Example 4 were compressed under the condition of a load speed of 0.5 mN/second, and the compression displacement until the resistance value was detected was measured using a microcompression tester, MCTM-500 (manufactured by SHIMADZU CORPORATION) to evaluate the insulation property of the covered particles. It can be estimated that as the compression displacement until the resistance value is detected becomes larger, the insulating property of the covered particles becomes higher. When the arithmetic average value of compression displacements until the resistance value was detected was 10% or more, the insulating property of the covered particles was rated as "very good" (shown by the symbol "◯" in Table 2). When the arithmetic average value of compression displacements was more than 3% and less than 10%, the insulating property of the covered particles was rated as "good" (shown by the symbol "Δ" in Table 2). When the arithmetic average value of compression displacements was 3% or less, the insulating property of the covered particles was rated as "poor" (shown by the symbol "x" in Table 2). Table 2 shows the results.

TABLE 2

|  | Conductivity | Insulting property |
|---|---|---|
| Example 2 | ○ | ○ |
| Comparative Example 4 | ○ | x |
| Reference Example 1 | ○ | Δ |

As shown in table 2, it is found that the covered particles of Example 2, which were surface-treated with benzotriazole, is also excellent in the insulating property while maintaining conductivity as compared with the covered particles of Comparative Example 4, which were not surface-treated. It is found that although Reference Example 1, the coverage of which is adjusted to a coverage equivalent to that of Comparative Example 4, has a coverage equivalent to that of Comparative Example 4, Reference Example 1 is excellent in the insulating property, and the insulating effect of benzotriazole is therefore obtained.

INDUSTRIAL APPLICABILITY

Covered particles of the present invention have excellent adhesion between insulating layers and electroconductive particles due to phosphonium groups which the insulating layers have and a triazole-based compound disposed on the surfaces of the electroconductive particles.

Such covered particles of the present invention can have high connection reliability.

The invention claimed is:

1. A covered particle, comprising: an electroconductive particle in which a metal film is formed on a surface of a core material, and a triazole-based compound is disposed on an outer surface of the metal film; and an insulating layer covering the electroconductive particle,
    wherein the insulating layer comprises a compound having a phosphonium group.

2. The covered particles according to claim 1, wherein the insulating layer comprises a plurality of particulates, or is a continuous film.

3. The covered particle according to claim 1, wherein the triazole-based compound is a benzotriazole-based compound.

4. The covered particle according to claim 1, wherein the metal film is a film of at least one selected from nickel, gold, a nickel alloy, and a gold alloy.

5. The covered particle according to claim 1, wherein the insulating layer comprises a polymer of at least one selected from a styrene, an ester, and a nitrile.

6. The covered particle according to claim 1, wherein the electroconductive particle has a plurality of projections on a surface.

* * * * *